(12) United States Patent
Bahnck et al.

(10) Patent No.: US 8,441,963 B2
(45) Date of Patent: May 14, 2013

(54) IP MULTICAST MANAGEMENT AND SERVICE PROVISION SYSTEM AND METHOD

(75) Inventors: Thomas J. Bahnck, Conshohocken, PA (US); Arthur P. Jost, Mount Laurel, NJ (US); Robert E. Mack, Collegeville, PA (US); Lawrence D. Vince, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 1776 days.

(21) Appl. No.: 11/288,797

(22) Filed: Nov. 29, 2005

(65) Prior Publication Data

US 2007/0030818 A1 Feb. 8, 2007

Related U.S. Application Data

(60) Provisional application No. 60/705,505, filed on Aug. 4, 2005.

(51) Int. Cl.
*H04L 12/16* (2006.01)
*H04Q 11/00* (2006.01)

(52) U.S. Cl.
USPC .......................... 370/270; 370/390; 370/432

(58) Field of Classification Search ............... 370/256, 370/270
See application file for complete search history.

(56) References Cited

U.S. PATENT DOCUMENTS

| 6,526,580 | B2 | 2/2003 | Shimomura et al. |
| 6,754,622 | B1 | 6/2004 | Beser et al. |
| 7,117,305 | B1 * | 10/2006 | Chilton ........................ 711/113 |
| 2002/0107969 | A1 * | 8/2002 | Waldvogel et al. ........... 709/231 |
| 2003/0061333 | A1 * | 3/2003 | Dean et al. ..................... 709/223 |
| 2003/0154306 | A1 | 8/2003 | Perry |
| 2004/0090970 | A1 * | 5/2004 | Sanchez et al. ............... 370/397 |
| 2004/0179539 | A1 | 9/2004 | Takeda et al. |
| 2004/0244058 | A1 | 12/2004 | Carlucci et al. |
| 2004/0258003 | A1 * | 12/2004 | Kokot et al. .................. 370/254 |

OTHER PUBLICATIONS

EPC Extended Search Report, RE: Application #06785311.9-2413/1913775; PCT/US2006024242 Oct. 22, 2009.
PCT International Search Report and Written Opinion for PCT/US2006/24242, dated Jun. 22, 2006.

* cited by examiner

*Primary Examiner* — Asad Nawaz
*Assistant Examiner* — Justin N Mullen
(74) *Attorney, Agent, or Firm* — Lori Anne D. Swanson

(57) ABSTRACT

A system (10), method (90) and apparatus (14) are provided for provisioning a multicast stream, such as an IP multicast stream, in a network. The system includes a first tier (12), such as a national backbone, with a first Multicast Address Discovery (MCAD) directory (34), and at least one second tier having a headend, such as a regional headend (14), with a second MCAD directory (36, 38). The system (10) includes a tiered MCAD directory network that allows the assignment of multicast addresses to multicast streams received from an upper tier MCAD directory. The tiered MCAD directory structure allows for requesting and storing stream descriptors and delivering stream descriptors on-demand to MCAD-enabled devices throughout the system. The system (10) also allows for stream provisioning maintenance and validation at lower tier headends via MCAD-enabled device queries or re-queries of upper tier MCAD directories.

17 Claims, 3 Drawing Sheets

IP MULTICAST MANAGEMENT AND SERVICE PROVISION SYSTEM AND METHOD

CROSS-REFERENCE TO RELATED APPLICATION

This application claims priority to the filing date of a U.S. provisional patent application having Ser. No. 60/705,505, entitled "IP MULTICAST MANAGEMENT AND SERVICE PROVISION SYSTEM AND METHOD", filed on Aug. 4, 2005, which is incorporated herein by reference in its entirety.

BACKGROUND OF THE INVENTION

1. Field of the Invention

The invention relates to multicast streams in a communications network, including Internet Protocol (IP) multicast streams. More particularly, the invention relates to provisioning multicast streams for use by headends or cores within communications networks.

2. Description of the Related Art

Due to the transmission of multiple versions of video content (e.g., national, regional and local) over networks, such as Internet Protocol (IP) transport networks, the number of video streams within the distribution portions of those transport networks is expanding. Typically, national feeds of video content are transmitted as multicast (MC) streams across a network backbone to regional and local hubs, also referred to as headends. At the regional and local headends, advertisement insertion requirements result in many regional and local versions of essentially the same video stream. The number of video streams is increased further by redundant copies of the video streams.

To receive a video stream of interest at the headend, the headend operator has to know several parameters about the video stream, including the multicast address (MCA), e.g., the IP multicast address (IP MCA), for the destination. The operator also has to know at least the user datagram protocol (UDP) port for the destination, and the Moving Picture Experts Group (MPEG) service number. Because several different video streams are received at the headend, the careful management, coordination and tracking of MCAs is necessary, as well as the efficient provisioning of devices in the distribution network.

Conventionally, the provisioning of video streams in devices is performed manually. However, manual provisioning of devices typically is inconvenient, and it also increases the likelihood of operator entry errors. Also, any changes to the video stream (e.g., transmit address changes) require the operator to make manual adjustments at each affected device.

Several conventional network protocols exist to provision network devices. The Domain Name System (DNS), a distributed Internet directory service that translates domain names into IP addresses, provides some provisioning, mainly for unicast addresses of hosts. However, DNS does not have a provision for providing the UDP port number and other desirable attributes of video stream content. Thus, DNS is not suitable for use with multicast video content and their systems.

Session Announcement Protocol (SAP), which is used to advertise multicast streams, typically contains within it a Session Description Protocol (SDP) payload, which describes multimedia sessions. However, as a broadcast protocol with a low repetition rate, SAP does not provide the on-demand provisioning service that devices throughout video distribution networks require. Moreover, if the SAP repetition rate is increased, the volume of data transmitted would overwhelm the network. SDP contains relevant information, but does not provide all the information devices may require in video stream descriptors. Moreover, SDP is not extensible to add information that may be required, either at present or in the future.

DETAILED DESCRIPTION

Figure 1:
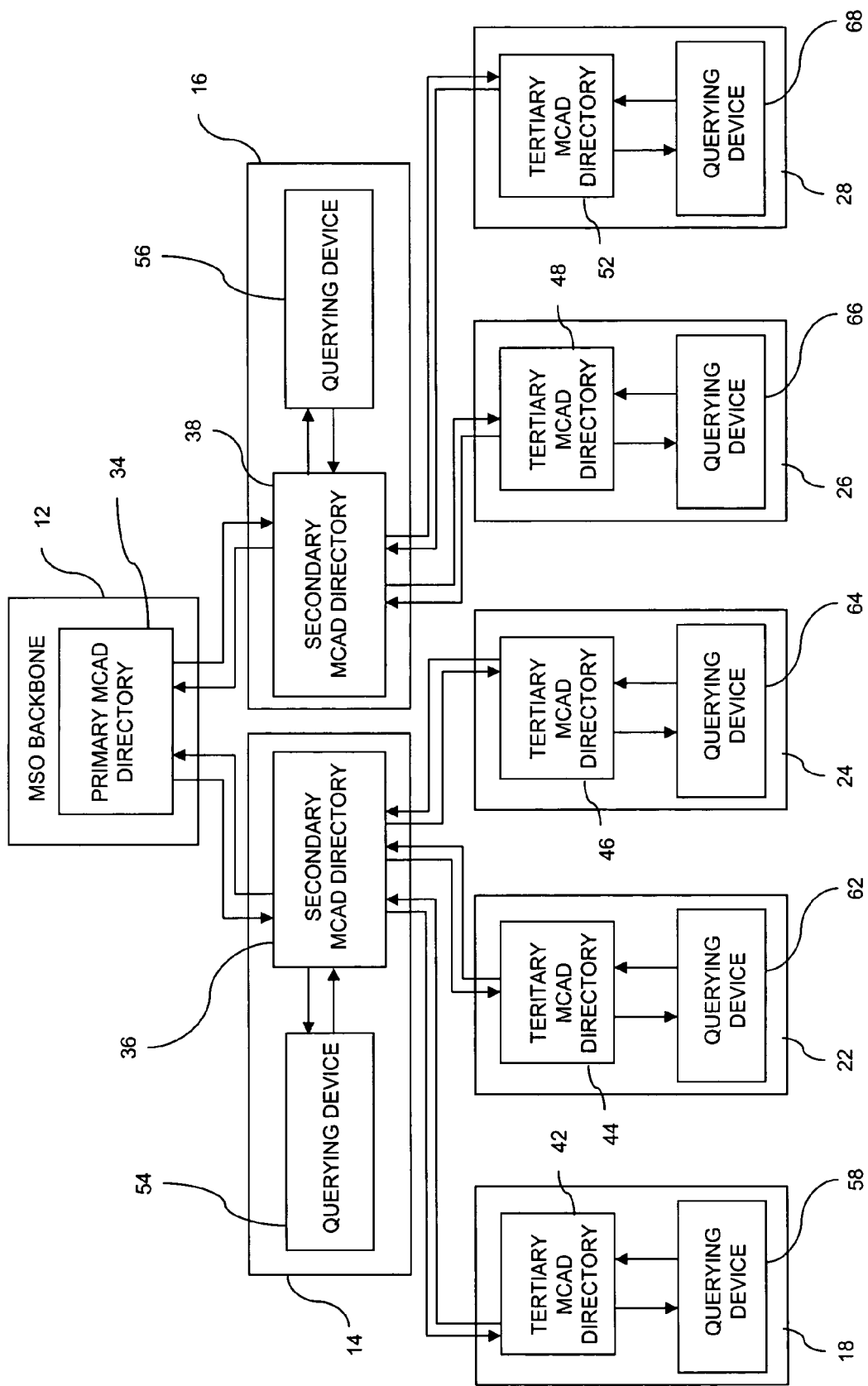
FIG. 1 is a block diagram of a system for provisioning multicast streams, such as IP multicast streams, in a communications network.

In the following description, like reference numerals indicate like components to enhance the understanding of the provisioning system and method through the description of the drawings. Also, although specific features, configurations and arrangements are discussed hereinbelow, it should be understood that such specificity and scale is for illustrative purposes only. A person skilled in the relevant art will recognize that other steps, configurations and arrangements are useful without departing from the spirit and scope of the invention.

Conventionally, to receive a valid multicast stream, such as an IP multicast stream, at the headend, operators must locate or identify various multicast stream information, including the multicast address (MCA) for the stream destination, the user datagram protocol (UDP) port of the destination, and the Moving Picture Experts Group (MPEG) service number. Changes in desired streams, e.g., changes in the transmit MCA, require operators to manually update each configured device. The burden on the operators to update all devices in all headends can be large, and chances of entry errors are increased.

Also, as the number of streams originating from the content providers grows, the total number of streams to manage grows exponentially as the originating stream is spliced at the regional and local levels. Regionalized and localized streams are produced to meet advertisement insertion requirements, and duplicate streams are produced for redundancy. A Multicast Address Discovery (MCAD) system, described herein, provides a system and method to alleviate the growing burden on operators to provision and maintain multicast streams. The MCAD system stores the required multicast stream information in descriptors, which can be requested automatically by the appropriate devices or components in the headend.

Referring to FIG. 1, shown is a block diagram of a system 10 for provisioning multicast streams, such as Internet protocol (IP) multicast streams, in a communications network. The system 10 includes a first or primary tier or level (shown generally as 12), and one or more second or secondary tier or level headends or cores 14, 16 coupled to the primary tier 12. Also, alternatively, the system 10 typically includes one or more additional tiers or levels with headends or cores coupled to the second tier headends 14, 16, e.g., one or more third or tertiary tier or level headends or cores 18, 22, 24 coupled to the secondary tier headend 14, and one or more third or tertiary tier or level headends or cores 26, 28 coupled to the secondary tier headend 16.

In the particular system configuration shown, the primary tier 12 typically is a network backbone, e.g., a multiple system operator (MSO) backbone at the national level. Although there is only one primary tier shown, the system 10 can have any suitable number of network backbones. The secondary cores 14, 16 can be regional headends or cores, e.g., headends or cores at the regional level. Similarly, the tertiary level cores 18-28 can be local headends or cores, e.g., headends or cores at the local level. The secondary and tertiary tiers can include any suitable number of headends. Also, tiers below the tertiary tier can include any suitable number of number of headends. As will be discussed in greater detail hereinbelow, each headend or core includes a plurality or components necessary for proper operation thereof.

Within the backbone and headend configuration of system 10, there is a tiered directory network generally mirroring the backbone and headend tiered distribution hierarchy. For example, the first tier 12 includes a primary Multicast Address Discovery (MCAD) directory 34. As will be discussed in greater detail hereinbelow, the MCAD directory 34 handles the provisioning, storage, and distribution of descriptors for video streams distributed from the primary tier 12.

The regional headends 14, 16 can include secondary MCAD directories 36, 38, respectively, coupled to the primary MCAD directory 34. Also, between the regional and local levels, the secondary MCAD directory 36 can have coupled thereto a plurality of tertiary MCAD directories 42, 44, 46, which correspond to or manage tertiary headends 18, 22, 24, respectively. Similarly, the secondary MCAD directory 38 can have coupled thereto a plurality of tertiary MCAD directories 48, 52, which correspond to or manage tertiary headends 26, 28, respectively.

Also, one or more of the secondary and tertiary headends can include at least one MCAD-enabled querying device, although only one querying device per headend is shown. That is, headends 14, 16, 18, 22, 24, 26, 28 can include at least querying devices 54, 56, 58, 62, 64, 66, 68, respectively.

Figure 2:
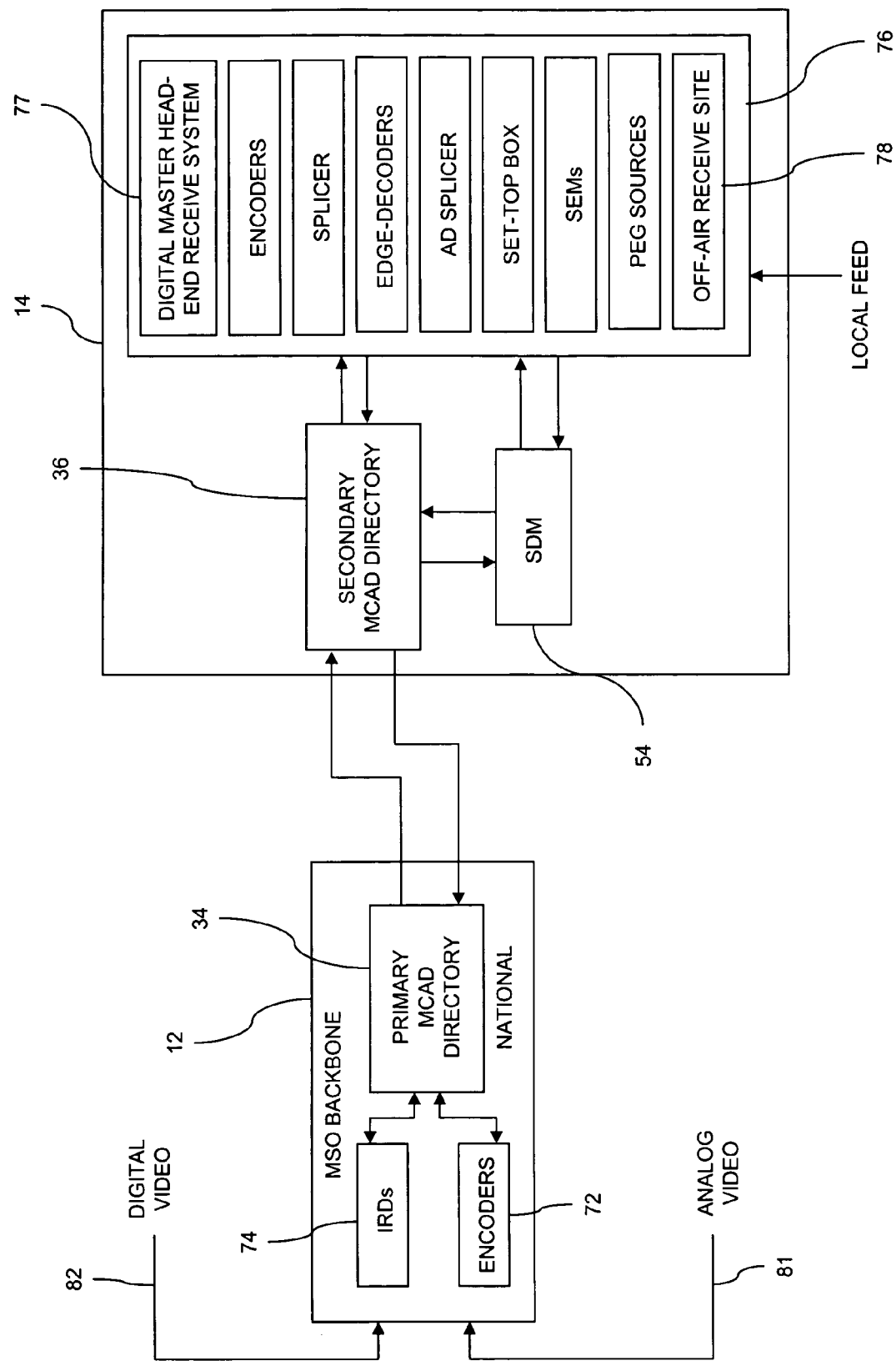
FIG. 2 is a block diagram of a secondary or regional headend (core) having an MCAD directory coupled to the MCAD directory of a primary or national headend (core), e.g., as shown in FIG. 1.

Referring now to FIG. 2, with continuing reference to FIG. 1, shown is a block diagram of the primary tier 12 and one of the secondary headends coupled thereto, e.g., the secondary headend 14. In addition to its managing MCAD directory 34, the primary tier 12 includes other components, e.g., conventional components necessary for proper operation at the national backbone level. For example, the primary tier 12 includes one or more encoders 72, one or more integrated receivers/decoders (IRDs) 74, and other components (not shown). As shown, the encoders 72 and IRDs 74 are coupled to the primary MCAD directory 34.

Similarly, the secondary headend 14 includes, in addition to its managing MCAD directory 36, other components or devices necessary for proper operation of the secondary headend 14. Such devices may include, e.g., encoders, splicers, groomers, edge decoders, advertisement splicers, servers, SmartStream Encryptor Modulators (SEMs) and Public, Educational and Government (PEG) sources, which collectively are shown as 76, and other components (not shown). SEMs, which are manufactured by Motorola, Inc., are components that, in general, perform encryption, modulation and upconversion functions in the network headend of interest, e.g., the secondary headend 14. It should be understood that any one or more of these devices are MCAD-enabled devices that can serve as a querying device.

As part of the MCAD-enabled devices 76, the secondary headend 14 also includes a headend receive system 77, which includes the equipment/components necessary to receive analog and/or digital video feeds, and encompasses all customer receivers. The secondary headend 14 also includes an off-air receive site 78, which includes the equipment/components necessary to receive local video feeds for distribution.

Also, the secondary headend 14 includes a network management device 79, whose functions and operation will be described in greater detail hereinbelow. Typically, the network management device 79 is a SmartStream Device Manager (SDM), which is manufactured by Motorola, Inc., or any other suitable component coupled to the MCAD directory. In general, the SDM is a device that interfaces headend products with network management systems that control, manage and monitor headend systems. As shown, the network management device 79 can be coupled to the MCAD directory 36 and the other headend components 76.

Communication and data transfer between MCAD directories occurs in accordance with the Hypertext Transfer Protocol (HTTP) or another suitable protocol. Also, communication and data transfer between components within a headend, e.g., between a headend's managing MCAD directory and one or more of the other components in the headend, is in accordance with HTTP or other suitable protocol.

At the first or national level, the primary tier 12 receives analog video 81 and digital video 82 and encodes the video for distribution to the regional headends, e.g., the secondary headend 14. The primary tier 12 produces a video stream that potentially is suitable for any regional or local headend to receive. Therefore, any stream descriptors included as part of these multicast streams ultimately must be accessible to and readable by the components in any regional or local headend. At the primary or national level, the MCAD directory 34 handles the provisioning, storage and distribution of descriptors for these streams.

An operator at each headend, regardless of the level of the headend, has the ability to assign multicast addresses and other stream parameters to the multicast transport streams either manually or, using the headend's MCAD directory, automatically. In this manner, the operators define a full service description for streams at their particular headend. At the national level, once the operator at the primary tier 12 has established the primary stream's multicast configuration, the managing MCAD directory, e.g., the MCAD directory 34, produces XML descriptors or other suitable stream descriptors. The descriptors are stored in a suitable repository, such as a database or network file system (NFS).

The stored stream descriptors are accessible to secondary headends via their managing MCAD directories. Therefore, in this manner, any of the devices in the regional headends that require multicast stream provisioning can, through their respective managing MCAD directory, query the primary MCAD directory to download a given stream's multicast configuration. The query process is initiated at the particular device in a headend that needs to be provisioned for a new multicast stream. The process of downloading and parsing multicast stream descriptors to turn them into useful configuration values for processing a stream typically is referred to as discovery.

Similarly, devices in lower level headends, e.g., devices in tertiary level headends, can then, via their managing MCAD directories, query secondary MCAD directories to obtain and store regional stream descriptors for locally-allocated headends. In this manner, and with the tiered distribution hierarchy of the system 10, the secondary level MCAD directories serve the same function for their respective tertiary level MCAD directories as does the primary tier for the secondary MCAD directories.

For example, a device in a secondary or regional headend queries its managing MCAD directory for the national multicast stream descriptor for a particular feed, e.g., a national feed from a particular cable television channel. If the headend's managing MCAD directory does not have any information on the requested multicast stream, the headend's managing MCAD directory queries the national MCAD directory on behalf of the requesting device in the secondary headend.

The MCAD directory at the primary tier delivers the stream descriptors for the requested feed to the regional MCAD directory, and the regional MCAD directory stores the stream descriptor for future use, e.g., future queries. The regional MCAD directory then delivers the stream descriptor to the device in its secondary tier, i.e., the device that initiated the query. Once the device receives the stream descriptor, the device parses the stream descriptor and provisions a multicast stream with its values.

Figure 3:
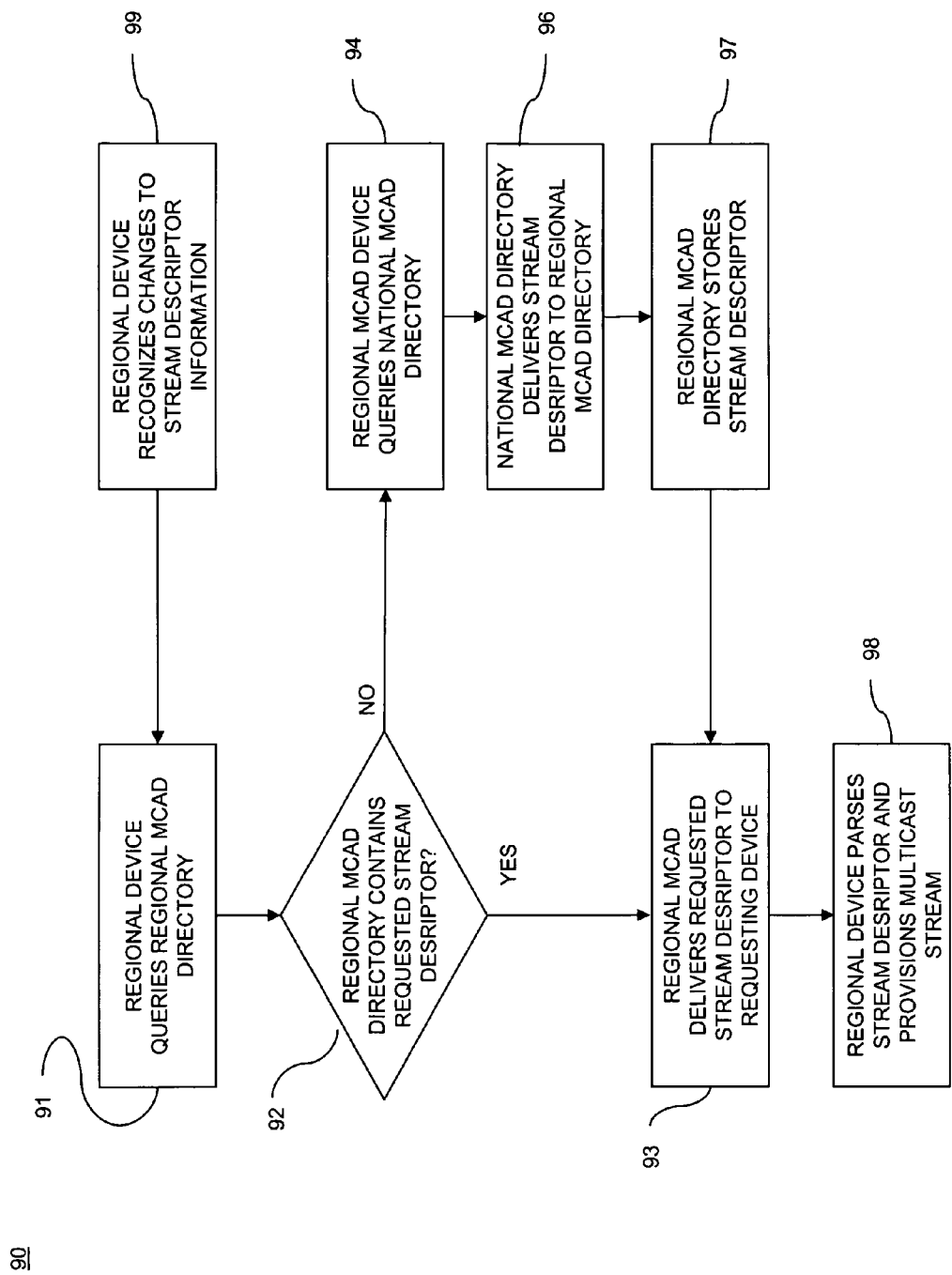
FIG. 3 is a block diagram of a method for provisioning multicast streams, such as IP multicast streams, in a communications network.

Referring now to FIG. 3, with continuing reference to FIG. 1 and FIG. 2, shown is a block diagram of a method 90 for provisioning multicast streams, such as IP multicast streams, in a communications network. Although the provisioning method shown in FIG. 3 illustrates the provisioning of a regional headend device, the provisioning method also is suitable for provisioning devices in other headends, e.g., tertiary headends and lower headends, as discussed hereinabove.

The method 90 includes the step 91 of a regional headend device querying its managing MCAD directory for a particular stream descriptor. The headend's managing MCAD directory determines if the requested stream descriptor is contained within the MCAD directory (step 92). If the requested stream descriptor is contained within the MCAD directory, the MCAD directory delivers or transmits the requested stream descriptor to the device that initiated the query (step 93). As discussed hereinabove, the requested stream descriptor is transmitted via any suitable data transmission protocol that is established between the managing MCAD directory and the other regional headend device(s). Such transmission protocols include, e.g., HTTP.

If the requested stream descriptor is not contained within the MCAD directory, the method 90 includes the step 94 of the regional MCAD directory querying the national MCAD directory (e.g., the MCAD directory 34) for the requested stream descriptor. The method 90 also includes the step 96 of the national MCAD directory delivering or otherwise transmitting the requested stream descriptor to the regional MCAD directory associated with the device that initiated the query. The query and the resulting stream descriptor transmission occurs via the established connection between the regional MCAD directory of the requesting device in the regional headend and the MCAD directory at the national level, and according to a suitable data transmission protocol, e.g., HTTP.

The method 90 also includes the step 97 in which the regional MCAD directory, upon receiving the requested stream descriptor from the national MCAD directory, stores the requested stream descriptor for future use. For example, the requested stream descriptor is stored in a storage location within the MCAD directory.

Once the storage step 97 is completed, the method 90 returns to the step 93, in which the regional MCAD directory transmits the requested stream descriptor to its requesting device. Upon this transmission, the method 90 also includes the step 98 of the requesting device parsing the stream descriptor and provisioning the stream, e.g., as discussed hereinabove.

The method 90 also includes a recognition step 99 in which the regional headend device recognizes any changes to stream descriptor information. Upon recognition of any changes, the regional headend device resubmits a query to its managing MCAD directory for the new stream descriptor information (step 91). The recognition step 99 is part of the maintenance features of the system 10, which maintenance features are described in greater detail hereinbelow.

The system also is capable of associating multicast streams to readable aliases. Once a suitable naming convention is established, operators at the devices can identify a service or particular stream by its alias, rather than having to look up a plurality of stream parameters (e.g., a multicast stream address, a port number, and an MPEG service number) to identify a stream. In this manner, unlike conventional systems and methods, the multicast stream carries a descriptor of itself that includes information that is readable by the operator, rather than a plurality of ambiguous addresses and numbers.

For example, for a national feed from a particular cable television channel, the alias can be established as "National Feed." Similarly, for a redundant national feed, the alias can be established as "Redundant National Feed." Other suitable aliases can include, e.g., "Regional Feed, ad zone #1" and "Regional Feed, ad zone #2."

At each headend at each tier (e.g., national, regional, local), the operator can assign a multicast address, alias and other stream parameters for each multicast transport stream in the respective headend's managing MCAD directory. The operator can manually enter the multicast addresses or, alternatively, can provide a range of MCAs from which the MCAD directory can choose to automatically assign addresses to newly-provisioned streams.

To provision transmitting devices with these streams, the operator needs general knowledge of the streams that are available. Accordingly, MCAD directories can deliver a master list when requested. The MCAD directory responds by providing an XML file or other suitably-structured file that lists available stream aliases for which the MCAD directory has descriptors. Alternatively, the querying devices can automatically download master lists periodically according to a schedule. Each stream element typically has a description sub-element, and one or more redundant stream elements associated with it.

For example, referring to FIG. 2, within the regional headend 14, the operator requests the master list descriptor, via, e.g., the SDM 79, from the headend's managing MCAD directory 36. In response to the request, the MCAD directory 36 provides the operator with the available streams. The operator selects an alias of a stream with which to provision a device, and the network management device 79 instructs the device to query its managing MCAD directory 36 for the new stream alias.

The master list also will make associations between primary and redundant streams. In this manner, the operator can instruct the network management device 79 to automatically provision devices with redundant streams while provisioning the primary streams. Alternatively, the operator can manually instruct devices to query the MCAD directory for redundant streams.

The headend device, now provisioned with the alias for a primary stream, and optionally redundant streams, then issues one or more requests (e.g., HTTP GET requests) to the MCAD directory 36 with the primary and redundant aliases as the resource references. For example, for provisioning IP multicast streams, the aliases can be uniform resource identifiers (URIs).

The regional MCAD directory 36 reads the requests and retrieves the appropriate alias descriptors from the appropriate storage location. For example, for provisioning IP multicast streams, the regional MCAD directory 36 parses the uniform resource locator (URL) for the key, which is understood to be the URI string following the host name and optional port number.

If the storage location is a network file system (NFS), a file name mapping scheme can be used, in which the alias can be mapped to a file name. If the storage platform is a database, the alias can serve as the key for a descriptor query. As an example, in the instance of file name mapping, if a common web server, such as Apache, was implemented, a simple directive in the "httpd.conf" file would instruct the server to retrieve a descriptor XML file. If a database was implemented, the HTTP request to the MCAD directory could invoke a command or program, e.g., a servlet, on an application server to query the database, which would result in the return of the descriptor in XML format.

Upon receiving each alias descriptor back from the regional MCAD directory 36, the device parses the requested stream descriptors for the stream MCAs. By using existing messaging, e.g., XML messaging, a set of standardized parsing application programming interfaces (APIs) can be used. Thus, custom parsers do not have to be coded. However, slightly increased processing overhead and longer descriptor message lengths may result.

Once the MCAs for the requested streams are parsed from the descriptor, the device issues a command, such as an "IGMP join," for the identified streams. An IGMP join command is a command to network routers that the particular device wants to join a multicast group for the provisioned stream. Other information in the requested stream descriptor is used as needed. Once the device joins the multicast group for the provisioned stream, the initial provisioning for the multicast stream is complete.

The system 10 includes the ability to validate streams that a particular device in a headend is receiving. Such validation can occur for a device at the regional, local or other levels. As the particular device is successfully processing a given multicast stream, the device verifies that content exists in the stream by monitoring incoming packet levels and checking the protocol and content of the packets.

If the device recognizes a general change in the stream, such as in the Program Map Table (PMT) version or cyclic redundancy check (CRC) checksum, the device will check the value of an alias descriptor, carried in the stream for the MCAD system. The CRC checksum is produced by the CRC function for the purpose of detecting errors in data storage or, in this case, data transmission. The device only checks the alias descriptor if a general error indicator, such as the CRC checksum, has changed; otherwise, the overhead involved in extracting every alias descriptor in the PMT would debilitate the performance of the device. If the alias descriptor value does not match the alias for which the device is provisioned, or is absent, the device requires its associated managing MCAD directory for its provisioned alias descriptor.

If the device detects that content is absent altogether from the primary stream, one possible course of action for the device is to check for the availability of a redundant stream. If a redundant stream is available, the device can switch to the redundant stream and wait for the primary stream to be restored. If no redundant stream is available, the device can then check to see if there is any legitimate cause to interrupt the stream. For example, the device can check to see if a video on demand (VOD) command has been issued, or if an event occurred that legitimately interrupted a single-program transport stream (SPTS). If the device determines that there has been no legitimate cause to interrupt the stream, the device can issue an alarm. Such is but one possible course of action in the event that content is detected missing from the primary stream.

When issuing alarms, the device can send alarms over the network, i.e., throughout the system 10. The system 10 is configured such that the MCAD directories and associated devices at least follow the reporting and processing conventions of conventional headend devices. If there is complete data transmission failure, these devices can be the primary equipment to inform the controller or other devices, and possibly devices in other network headends, of a system failure.

In situations where a querying device receives no response or receives a corrupt descriptor from its managing MCAD directory, the querying device can take advantage of the inherent redundancy of stream descriptors at tiers one level higher than the particular device of interest. For example, if a device in a local headend requests a descriptor for a national stream, but cannot communicate with its managing MCAD directory, the local device knows that the MCAD directories at the regional and national levels have descriptors for the same stream. The local device would need knowledge of the IP addresses of its managing MCAD directory's parent and grandparent MCAD directories. Upon detecting a failure at the local level, the local device itself can query the parent and/or grandparent MCAD directories.

For redundancy in local stream descriptors, MCAD directories can be made to support a hybrid repository structure, in which the particular MCAD directory primarily uses its database to store and retrieve descriptors, but saves redundant descriptors as XML files on the network file system. Therefore, if the primary MCAD server goes offline, a redundant interface to the network file system still allows access to the redundant descriptors. Alternatively, the system 10 can have identical MCAD servers at each headend. Thus, for example, if the primary MCAD server in a regional headend goes offline, a backup can take the role of the offline primary device, either automatically or in response to a direct command to do so.

Also, alternatively, the operator can manually provision multicast streams in the event of MCAD directory failure. That is, through any suitable interface, the operator can manually enter any necessary information for each provisioned stream, e.g., the MCA, the UDP port, the package identification (PID) code, and/or the MPEG service number.

In addition to initially provisioning a stream for devices in particular network headends, as well as validating stream content, the system 10 also provides for maintenance or reassignments, e.g., when an MCA for a provisioned stream has been changed. Since devices are given MCAs for streams at the time the devices are initially provisioned, the devices normally would not know in real-time whether an MCA has been changed, unless additional accommodations are made within the overall MCAD directory structure and operation. However, the system 10 makes use of a descriptor in a particular portion of the stream, e.g., the MPEG Program Map Table (PMT), that constantly identifies the stream alias.

By monitoring this particular portion of the stream, the device can recognize validation events, e.g., changes in the descriptor value or a missing descriptor parameter. Upon recognition of this change, the device re-queries its managing MCAD directory for the new address. The managing MCAD directory and the rest of the system repeat the provisioning process as if the re-query was an initial query.

With respect to the contents of the stream aliases, MPEG video specification supports any number of custom descriptors, according to existing standards established by the International Standards Organization (ISO) and the International Electrotechnical Commission (IEC). In MPEG-2, the descriptor identification (ID) is one byte in length. Therefore, the number of custom descriptor spaces available is limited to 256. The first 64 descriptor indexes are pre-defined in the MPEG-2 specification and reserved. Private user descriptors can start at index 64 and occupy the remaining 192 slots. In the system 10, a custom descriptor is reserved to store the alias. Each MPEG-2 stream can contain a PMT with the alias descriptor. A device would know to refresh its multicast configuration when the device recognizes a change in this value.

Alternatively, if carrying video according to the MPEG-4 video specification, an object descriptor stream (which is carried along with the audio, video and other streams) carries various metadata about the programs in the streams. Since any reasonable number of extension descriptors can be carried in the object descriptor stream, the object descriptor stream potentially can carry MCAD parameters. Also, according to the MPEG-4 specification, an Object Content Identification (OCI) stream is carried, either out-of-band or in-band. MCAD descriptors potentially can be carried there as well.

For example, with respect to maintenance, assume an MCAD-enabled device in a regional headend within the system 10 is receiving a multicast stream with the alias "espn.n" (e.g., ESPN national feed) on the MCA 224.4.0.1. Also, assume that an operator at the national MCAD directory has changed the MCA allocation such that 224.4.0.1 is now assigned to a different stream, which has the alias "espn.c.n" (e.g., ESPN Classic national feed), and the multicast stream with the alias "espn.n" has been reassigned to a different MCA. The device, which still is provisioned for "espn.n," recognizes the change in alias, and re-queries its managing MCAD directory for "espn.n". The regional MCAD directory responds with the new descriptor for "espn.n". In the manner discussed previously herein, the device parses the new descriptor, extracts the new MCA, and begins receiving the "espn.n" stream on its new multicast address.

Alternatively, assume the operator reassigned a stream to a new MCA, but did not allocate a new stream to the old MCA. In such scenario, the device would recognize the absence of the alias descriptor in the stream, and re-query its managing MCAD directory for the fresh stream descriptor. In the system 10, either situation results in a recognizable change in the PMT descriptor.

As discussed hereinabove, the discovery process involves downloading and parsing multicast stream descriptors to turn them into useful configuration values for processing a stream. During the discovery process, a variety of error scenarios can arise. Devices at any level in the system can have their messages lost. Also, MCAD directory servers and other components can be busy or not operating properly. As discussed previously herein, communication and data transfer between and within MCAD directories can occur via HTTP or other suitable transmission protocol. Because of this, the system 10 is well suited to use their inherent properties, such as existing error codes and forms of authentication, to handle and correct such errors.

In the system 10, MCAD directory components can include a web server, a descriptor repository (e.g., a network file system or a database), and a user interface (UI). One machine can house all of these components. Alternatively, a distributed architecture can be used to better control relatively high volumes of streams and to provide more scalability and extensibility to the MCAD directory configuration. If the repository is a database, an application server can be used, potentially along with a dedicated database server. Also, if particular MCAD directories process relatively heavy loads, a proxy cache and a load balancer can be used in the web server platform.

For example, an MCAD directory at the first or national level can service requests from all MCAD directories from regional headends. Regional MCAD directories can send their own requests, as well as forwarded requests from MCAD directories in local level (and lower) headends. In this manner, the national MCAD directory server can process requests from the entire MCAD-enabled population, at least initially, before stream descriptors are delivered to and stored at the lower headend levels. As such, a more distributed platform configuration is useful.

The system and method described herein can automatically assign multicast addresses to streams, associate MCAs with user-friendly aliases, and provision devices on-demand with those MCAs, for both persistent and substitute services. The system includes tiers of MCAD directories for storing stream descriptors, and delivering them on-demand. The system and method can use standards-based protocols to drive the system to facilitate interoperability among several types of devices. Moreover, the system and method include processes to refresh multicast configurations in the event that their parameters change.

It will be apparent to those skilled in the art that many changes and substitutions can be made to the provisioning system and method herein described without departing from the spirit and scope of the invention as defined by the appended claims and their full scope of equivalents.

What is claimed is:

1. A method for provisioning a multicast stream in a tiered MCAD directory network that includes a first tier having a first Multicast Address Discovery (MCAD) directory and a second tier having a headend that includes a second MCAD directory and at least one MCAD-enabled device, the first MCAD directory coupled to the second level MCAD directory, the method comprising:

producing, in the first tier of the tiered MCAD directory network, multicast streams for distribution to a second tier of the tiered MCAD directory network producing, by the MCAD directory in the first tier, descriptors for each of the multicast streams wherein an MCAD system stores multicast stream information in the multicast stream descriptors and the descriptors are stored at different tiers in the tiered MCAD directory network;

wherein managing requests from an MCAD-enabled device in the tiered MCAD directory network includes:

querying the MCAD directory in a tier of the requesting MCAD-enabled device for the multicast stream descriptor for the corresponding multicast stream for transmission to the MCAD-enabled device if the MCAD directory in the respective tier includes the multicast stream descriptor for the corresponding multicast stream, else, querying a higher tier in the MCAD directory network for the multicast stream descriptor for the corresponding multicast stream, via the MCAD directory in the tier of the requesting MCAD-enabled device, wherein the descriptors in the higher tier are accessible to devices in a lower tier via coupled MCAD directories, and transmitting the multicast stream descriptor for the corresponding multicast stream to the MCAD directory in the tier of the requesting MCAD-enabled device for storing for subsequent requests;

wherein the requested multicast stream descriptor is transmitted by the MCAD directory in the tier of the requesting MCAD-enabled device to the MCAD-enabled device, parsing, by the MCAD-enabled device, a first multicast stream descriptor to obtain at least one set of video stream information; and provisioning, by the MCAD-enabled device, a first multicast stream that corresponds to the multicast stream descriptor using the at least one set of video stream information parsed from the first multicast stream descriptor.

2. The method as recited in claim 1, wherein the first stream multicast descriptor has associated therewith an alias, and wherein the MCAD-enabled device queries the second MCAD directory for a first multicast stream descriptor by requesting the first stream descriptor by the alias of the first stream descriptor.

3. The method as recited in claim 2, wherein, once the MCAD-enabled device has the first stream descriptor, if the alias associated with the first stream descriptor changes, the method further comprises:

responsive to the MCAD-enabled device recognizing changes in a portion of the first stream descriptor, initiating, by the MCAD-enabled device, a second provisioning request for a second stream descriptor.

4. The method as recited in claim 1, further comprising:

validating, by the MCAD-enabled device, a content of the provisioned stream responsive to the MCAD-enabled device detecting a change in the content of a portion of the provisioned stream.

5. The method as recited in claim 4, wherein validating, by the MCAD-enabled device, the content of the provisioned stream comprises:

querying the second MCAD directory for a video stream descriptor.

6. The method as recited in claim 1, wherein:

responsive to the MCAD-enabled device detecting a change in a portion of the provisioned stream, checking, by the MCAD-enabled device, for a stream redundant to a first stream of the multicast streams;

responsive to a redundant stream being present, switching the MCAD-enabled device to the redundant stream, responsive to a redundant stream not being present, checking, by the MCAD-enabled device, for a legitimate cause to interrupt the first stream, and responsive to the MCAD-enabled device not identifying the legitimate cause to interrupt the first stream, initiating an alarm.

7. The method as recited in claim 1, wherein the MCAD-enabled device queries the first MCAD directory for the first multicast stream descriptor.

8. The method as recited in claim 1, wherein the first stream multicast descriptor is received according to a Hypertext Transfer Protocol (HTTP) transmission protocol.

9. A system for provisioning a multicast stream in a network, comprising:

a primary tier having a primary Multicast Address Discovery (MCAD) directory, wherein the primary tier produces at least one multicast video stream that includes an in-stream alias descriptor, wherein the in-stream alias descriptor has associated therewith a stream descriptor assigned to at least one set of video stream information; and a secondary tier having a headend that includes a secondary MCAD directory and a MCAD-enabled device the secondary MCAD directory coupled to the primary MCAD directory;

wherein the primary MCAD directory is coupled to the secondary MCAD directory such that managing requests from an MCAD-enabled device in the tiered MCAD directory network includes:

querying the MCAD directory in a tier of the requesting MCAD-enabled device for the multicast stream descriptor for the corresponding multicast stream for transmission to the MCAD-enabled device if the MCAD directory in the respective tier includes the multicast stream descriptor for the corresponding multicast stream, else, querying a higher tier in the MCAD directory network for the multicast stream descriptor for the corresponding multicast stream, via the MCAD directory in the tier of the requesting MCAD-enabled device, wherein the descriptors in the higher tier are accessible to devices in a lower tier via coupled MCAD directories, and transmitting the multicast stream descriptor for the corresponding multicast stream to the MCAD directory in the tier of the requesting MCAD-enabled device for storing for subsequent requests;

wherein the requested multicast stream descriptor is transmitted by the MCAD directory in the tier of the requesting MCAD-enabled device to the MCAD-enabled device, wherein the MCAD-enabled device parses the stream descriptor to obtain the at least one set of video stream information, and wherein the MCAD-enabled device provisions the at least one multicast video stream for the MCAD-enabled device using the at least one set of video stream information.

10. The system as recited in claim 9, wherein the primary tier further comprises a national network backbone and the headend further comprises a regional headend.

11. The system as recited in claim 9, wherein the primary tier further comprises a regional tier and the secondary tier further comprises a local tier.

12. The system as recited in claim 9, wherein the MCAD-enabled device queries at least one of the first and second MCAD directories based on the MCAD-enabled device detecting a change in contents of a portion of the in-stream alias descriptor.

13. The system as recited in claim 9, wherein the MCAD-enabled device switches from the multicast video stream to a redundant multicast video stream, if available, based on the MCAD-enabled device detecting a change in contents of a portion of the in-stream alias descriptor.

14. An apparatus for provisioning a multicast stream, wherein the multicast stream has associated therewith a stream descriptor that has assigned thereto at least one set of video stream information, the apparatus comprising:

a Multicast Address Discovery (MCAD) directory; and at least one MCAD-enabled querying device coupled to the MCAD directory, wherein the MCAD-enabled querying device, in response to a provisioning request, queries the MCAD directory for the stream descriptor, wherein managing requests from the MCAD-enabled querying device includes:

querying the MCAD directory in a tier of the requesting MCAD-enabled device for the multicast stream descriptor for the corresponding multicast stream for transmission to the MCAD-enabled device if the MCAD directory in the respective tier includes the multicast stream descriptor for the corresponding multicast stream, else, querying a higher tier in the tiered MCAD directory network for the multicast stream descriptor for the corresponding multicast stream, via the MCAD directory in the tier of the requesting MCAD-enabled device, wherein the descriptors in the higher tier are accessible to devices in a lower tier via coupled MCAD directories, and transmitting the multicast stream descriptor for the corresponding multicast stream to the MCAD directory in the tier of the requesting MCAD-enabled device for storing for subsequent requests, wherein the requested multicast stream descriptor is transmitted by the MCAD directory in the tier of the requesting MCAD-enabled device to the MCAD-enabled device, wherein the MCAD-enabled querying device parses the stream descriptor to obtain the at least one set of video stream information, and wherein the MCAD-enabled querying device provisions the multicast stream using the at least one set of video stream information.

15. The apparatus as recited in claim 14, wherein the stream descriptor has associated therewith an alias, and wherein the MCAD-enabled querying device queries the MCAD directory for the stream descriptor by requesting the stream descriptor using the alias of the stream descriptor.

16. The apparatus as recited in claim 14, wherein the MCAD-enabled querying device further comprises a component selected from a group consisting of a SmartStream Device Modulator (SDM), a SmartStream Encryptor Modulator (SEM), a set-top box, an encoder, a splicer, an ad splicer, a groomer, and an edge decoder.

17. The apparatus as recited in claim 14, wherein at least one of the MCAD address directory and the MCAD-enabled querying device are contained in a single headend device.

* * * * *